United States Patent
Kris et al.

(10) Patent No.: US 6,525,501 B1
(45) Date of Patent: Feb. 25, 2003

(54) METHOD AND APPARATUS FOR ACCELERATING COMMUNICATION BETWEEN CONTROLLABLE DEVICES

(75) Inventors: Bryan R. Kris, Chandler; Cristian P. Masgras, Mesa, both of AZ (US)

(73) Assignee: Motorola, Schaumburg, IL (US)

(*) Notice: Subject to any disclaimer, the term of this patent is extended or adjusted under 35 U.S.C. 154(b) by 0 days.

(21) Appl. No.: 09/580,292

(22) Filed: May 26, 2000

(51) Int. Cl.[7] .............................................. G05B 11/28
(52) U.S. Cl. ........................ 318/599; 318/807; 318/811
(58) Field of Search ................................. 318/138, 139, 318/245, 254, 439, 599, 721, 807, 811, 685, 671, 611; 340/347 DA, 347 M; 307/265, 234; 348/743; 323/283, 288; 347/10

(56) References Cited

U.S. PATENT DOCUMENTS

| | | | | |
|---|---|---|---|---|
| 4,047,083 A | * | 9/1977 | Plunkett | 318/231 |
| 4,502,024 A | * | 2/1985 | Nishikawa et al. | 332/9 R |
| 4,532,496 A | * | 7/1985 | Ichinose | 340/347 DA |
| 4,928,043 A | * | 5/1990 | Plunkett | 318/254 |
| 5,014,016 A | * | 5/1991 | Anderson | 330/10 |
| 5,093,582 A | * | 3/1992 | Itoh et al. | 307/265 |
| 5,423,192 A | * | 6/1995 | Young et al. | 62/228.4 |
| 5,469,033 A | * | 11/1995 | Huang | 318/439 |
| 5,491,978 A | * | 2/1996 | Young et al. | 62/126 |
| 5,532,561 A | * | 7/1996 | Huang | 318/439 |
| 5,598,074 A | * | 1/1997 | Huang | 318/439 |
| 5,652,525 A | * | 7/1997 | Mullin et al. | 324/772 |
| 5,666,035 A | * | 9/1997 | Basire et al. | 318/254 |
| 5,789,895 A | * | 8/1998 | Lee | 318/811 |
| 5,825,151 A | * | 10/1998 | Ikawa et al. | 318/685 |
| 5,936,565 A | * | 8/1999 | Bogdan | 341/152 |
| 6,023,420 A | * | 2/2000 | McCormick et al. | 363/131 |
| 6,051,943 A | * | 4/2000 | Rabin et al. | 318/254 |
| 6,100,662 A | * | 8/2000 | Hansen | 318/685 |
| 6,177,787 B1 | * | 1/2001 | Hobrecht | 323/283 |
| 6,299,272 B1 | * | 10/2001 | Baker et al. | 347/10 |

* cited by examiner

*Primary Examiner*—Robert Nappi
*Assistant Examiner*—Edgardo San Martin
(74) *Attorney, Agent, or Firm*—Anthony M. Martinez; Mark J. Fink

(57) ABSTRACT

The present invention is a method and apparatus for data communication between controllable devices, and more particularly, between a first programmable device (21) and at least one second programmable device (31) coupled to a processor. In one embodiment in accordance with the present invention, the second programmable device (31) includes an addressable memory location and an output, and is adapted to receive data from a processor. In this embodiment, the first programmable device (21) is programmed to decode at least one addressable memory location from the processor and enabled to transmit each address to each second programmable device (31) in a first simultaneous write operation. The first programmable device (21) then selects at least one of the second programmable devices (31) to output a signal (33) corresponding to the data in a second write operation.

21 Claims, 4 Drawing Sheets

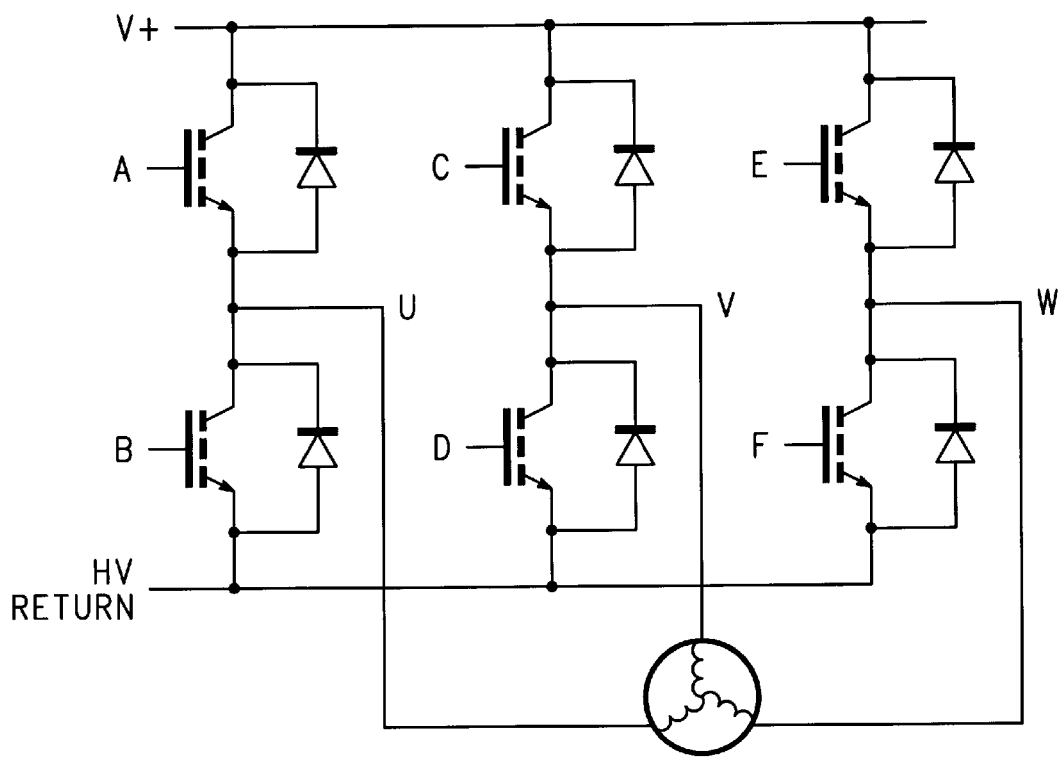
FIG. 4
-PRIOR ART-
FIG. 5
-PRIOR ART-
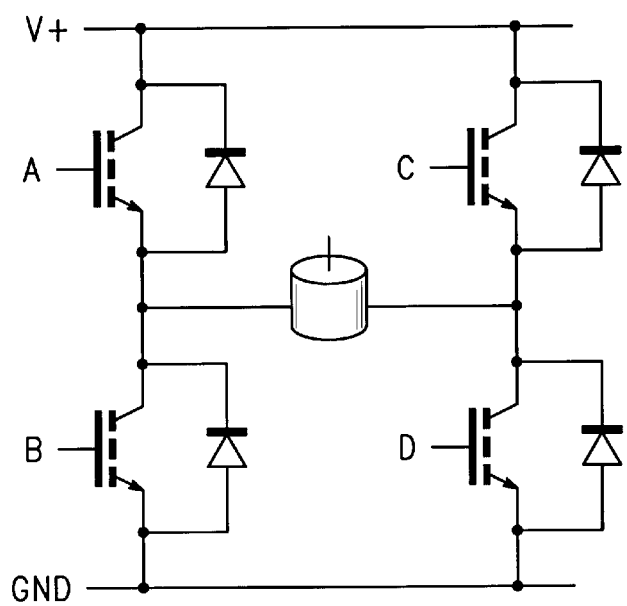

METHOD AND APPARATUS FOR
ACCELERATING COMMUNICATION
BETWEEN CONTROLLABLE DEVICES

BACKGROUND OF THE INVENTION

1. Technical Field

The present invention relates to the field of communication between controllable devices, and more particularly, to the field of providing accelerated communication between a first programmable or controllable means and a second programmable or controllable means.

2. Background

A processor (such as, for example, a computer processor, a central processing unit or a digital signal processor) is a known circuit in the field of controllable devices. When a processor is used to control motors, the processor is usually coupled to at least one pulse width modulator (PWM) generator or circuit to operate the motor for a particular duration or for a particular duty cycle. By using PWM modulator generators, power is applied to the motor in a defined and controlled sequence (depending on the load requirements) to make the motor turn. PWM generators provide a cost efficient way to generate control signals to switching elements (such as, for example, transistors, insulated gate bipolar transistors or field effect transistors) that supply power to a motor.

Typically, motor control systems utilize many (two, four, six or more) generator circuits to individually control each switching element connected to the motor. Brushless DC (direct current) motor control systems (as seen, for example, in FIG. 4) use six switching elements while DC brush motor control systems use four switching elements (such as, for example, as seen in FIG. 5). At any one time, only two PWM generators (and thus, only two switching elements) are turned on to enable current to flow through the desired motor winding which results in a desired rotational direction. As the motor revolves, the electric current needs to be routed through the motor windings in a specified sequence. This process is known as communication.

In order for the motor to maintain a constant speed or to maintain other controllable characteristics, the processor must periodically load new data into each PWM generator on the order of hundreds to thousands of times a second. When multiple PWM generators are used to control the motor, each generator must be reloaded individually during separate write cycles. This reloading process leads to longer refresh times (and thus more processor clock cycles) to control the motor, which may be inefficient depending on the motor. Thus, for example, in a motor which is being controlled by up to six PWM generators, a processor may be required to load or reload new data to each of the six PWM generators in excess of 20,000 times a second. However, the processor must write data information to each PWM generator for each reloading process. Thus, in this example, a minimum of six write operations are required to load data into each of the six PWM generators every time new data is required to control the motor.

What is needed is a method and apparatus for optimizing the data communication that occurs during write cycles between controllable devices in order to provide more efficient control of a load and to reduce the multiple write operations placed on the processor.

BRIEF DESCRIPTION OF THE DRAWINGS

The accompanying Figures, where like reference numerals refer to identical or functionally-similar elements throughout the separate views and which are incorporated in and form part of the specification, further illustrate the present invention and, together with the detailed description of the invention, serve to explain the principles of the present invention.

FIG. 4 illustrates the six switching elements of a conventional, prior art three phase bridge circuit design which applies power to a dc brushless motor; and FIG. 5 illustrates the four switching elements of a conventional, prior art H-bridge circuit design which applies power to a DC brush motor.

DETAILED DESCRIPTION OF THE DRAWINGS

The present disclosure describes a method and apparatus for data communication between controllable devices, and more particularly, between at least two programmable devices coupled to a processor. In accordance with one embodiment of the present invention, at least one of the programmable devices includes an addressable memory location and an output, and is adapted to receive data from the processor. In this embodiment, one of the programmable devices is programmed to decode at least one addressable memory location from the processor and is enabled to transmit each address to the other programmable devices in a first write operation. One of the programmable devices then selects at least one of the other programmable devices to output a signal corresponding to the data in a second write operation. Preferably, one of the programmable devices is a signal processing device and at least one of the other programmable devices is a pulse width modulator generator device.

Figure 1:
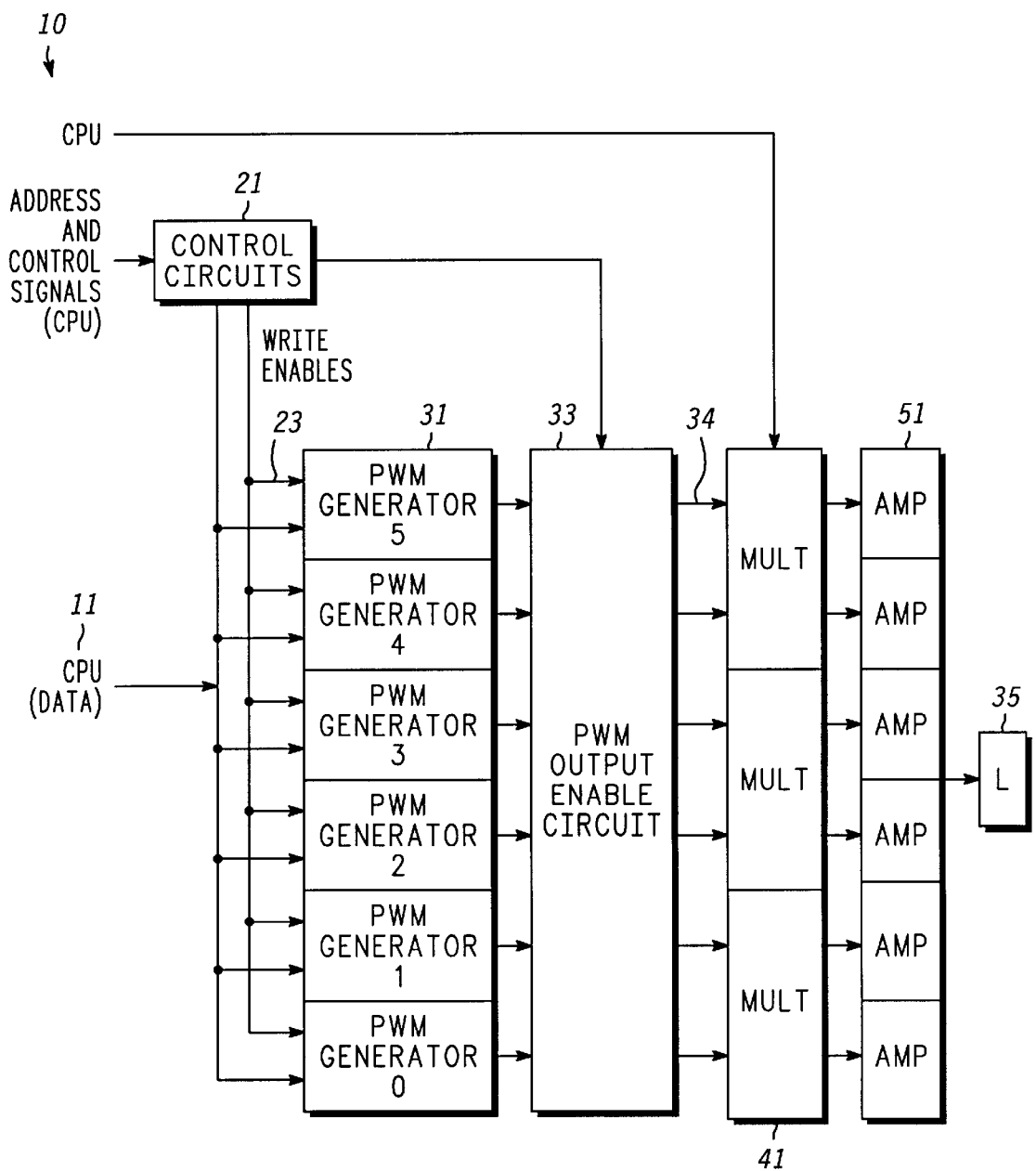
FIG. 1 is a block diagram in accordance with a preferred embodiment of the invention that illustrates the interaction between controllable devices.

Referring to FIG. 1, a processor or master processor (not shown, but whose output control signals (10) are generally identified as "CPU") (such as, for example, a microprocessor, a microcontroller, a central processing unit (CPU), a digital signal processor or the like) provides at least one address to a programmable device or a control processor (21). Each address generated by the processor is associated with a particular programmable device (31). The processor also provides data information (11) to each of programmable devices (31) with the data information relating to the desired duty cycle generated by each of the second programmable device (31). In this respect, the data information contains information relating to the operation of each programmable device (31) (such as, for example, when each programmable device (31) turns off or turns oil, and for what duration).

Programmable device (21) is programmed by methods known in the art to decode each encoded address received from the processor. Programmable device (21) then transmits an address signal (23) as a write enable signal to each programmable device (31) in a single (or, first) write operation. Thus, each decoded address is transmitted to all programmable devices (31) simultaneously, in a single write operation.

In a subsequent (or, second) write operation, programmable means (21) controls at least one programmable device (31) to output a signal (33) corresponding to the data provided by the processor. Programmable device 21 can accomplish this by either directly controlling each programmable device (31), or, as illustrated in FIG. 1, controlling an output enable device (34) to selectively determine which output signal (33) will be transmitted to a load (35). Each output signal (33) can then be transmitted to load (35) (such as a motor) to control load (35) as desired. Thus, the present invention allows programmable device (21) to simultaneously transmit address information to each programmable device (31) in a single write operation, and also allows at least one programmable device (31) to output at least one signal (33) to load (35) in a second write operation, thereby reducing the number of write operations required by the prior art. Therefore, when load (35) such as a motor is coupled to the output of any programmable device (31), the present invention will operate the motor in a controlled and efficient maimer.

Optionally, at least one programmable device (41) can be coupled between the output of each programmable device (31) and load (35). Each programmable device (41) being controlled by programmable device (21) or the processor. Preferably, each programmable device (41) is a controllable multiplexer which receives a plurality of signals (33) from selected programmable devices (31) and redirects signals (33) to load (35) as desired during the second write operation. This optional feature may provide more flexibility depending on the end-use application of the present invention.

As those of skill in the art will recognize, at least one amplifier (51) may be coupled between the output of each programmable device (31) and load (35), or between each programmable device (41) and load (35) to amplify the resulting signals for use by those applications which have a requirement of higher power.

Figure 2:
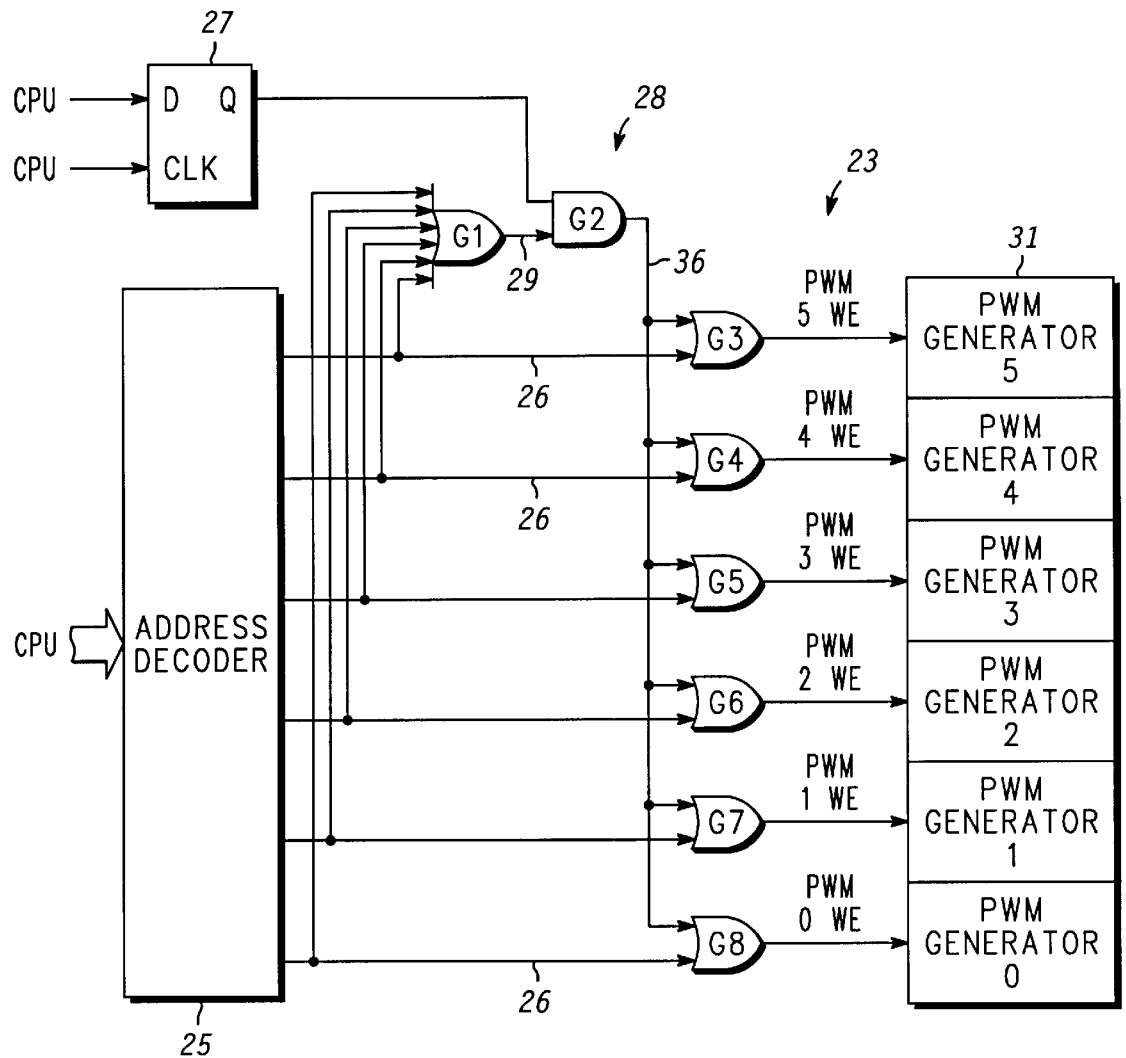
FIG. 2 is a logic block diagram embodiment corresponding to FIG. 1.

FIG. 2 illustrates an exemplary schematic for one possible design to implement the circuitry which enables PWM generator outputs. In this embodiment, programmable device (21) includes an address decoder (25), a controllable D flip flop logic circuit (27) and control logic (28) (identified generally as logic G1–G8), while each programmable device (31) is a pulse width modulator generator. In this embodiment, address decoder (25) provides a plurality of output signals (26) which are uniquely asserted whenever a specified combination of address and control signals are applied as inputs to address decoder (25) from the processor. All output signals (26) from address decoder (25) are combined together by an OR operation through gate G1 resulting in a PWM active signal (29). PWM active signal (29) is then combined with the output of D flip flop (27) by an AND gate G2, thereby resulting in a group enable signal (36). Group enable signal (36) is then combined with each output signal (26) of the address decoder (25) by a plurality of OR gates (e.g., G3–G8). As those of skill in the art will realize, if the processor sets the Q output of D flip flop (27) active and at least one output signal (26) from address decoder (25) is active, all outputs from gates G3–G8 will output a signal (23) corresponding to the information from address decoder (25) and, each output signal (26) is then transmitted by its respective gate G3–G8 to each programmable device (31) as address or enable signals (23).

Figure 3:
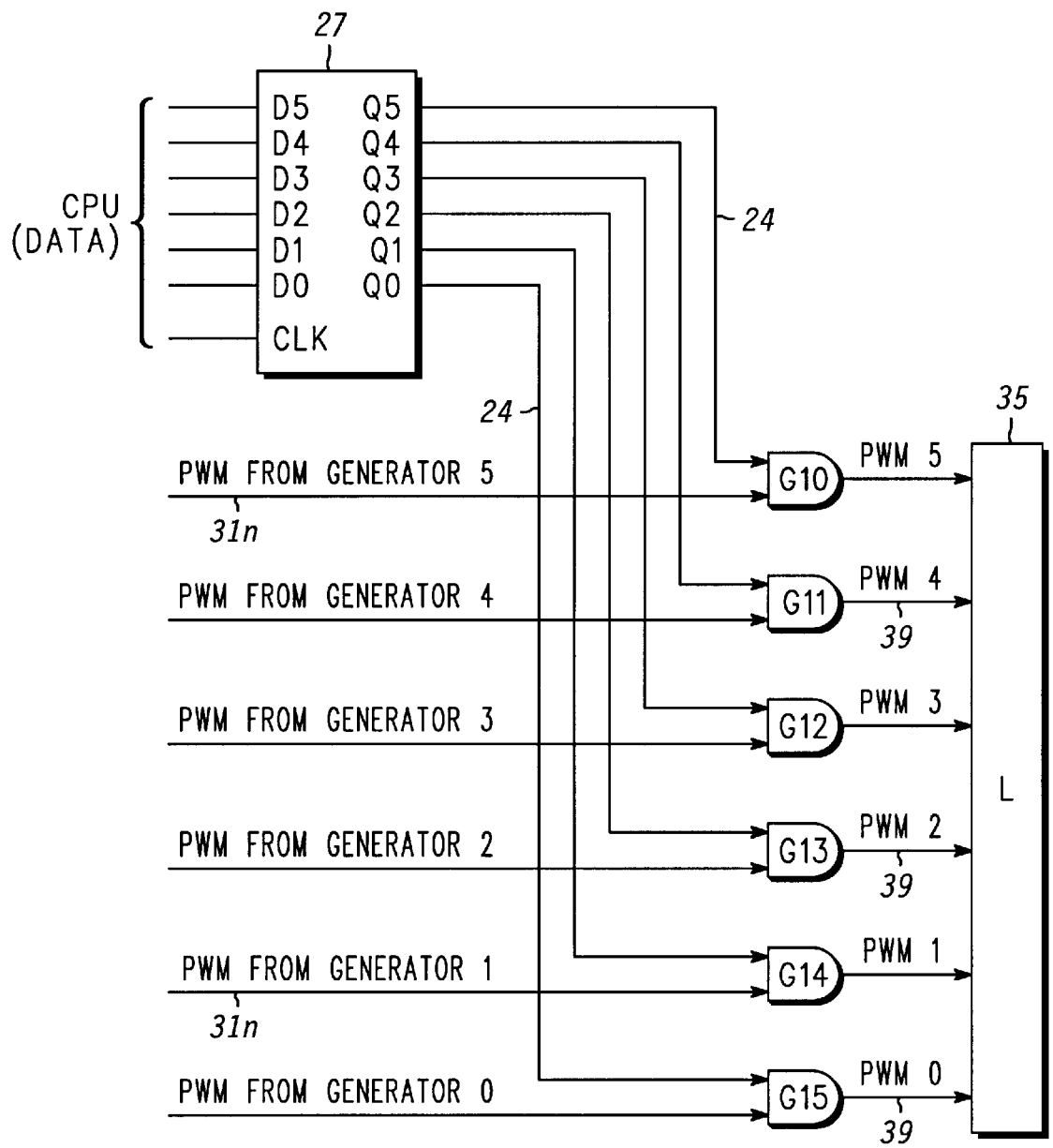
FIG. 3 is another logic block diagram embodiment corresponding to FIG. 1.

In some applications, it may be desirable to select what data will be forwarded to load (35). FIG. 3 illustrates another exemplary schematic for one possible design to implement circuitry which individually enables selected PWM generator outputs. In this embodiment, data information from each programmable device (31) is sent to at least one AND gate (e.g., G10–G15). The processor then controls D flip flop logic circuit (27) to output at least one signal (24) corresponding to which programmable device (31) is desired to output a signal (39). This signal (24) is also sent to at least one AND gate (e.g., G10–G15). The resulting output signal (39) from the AND operation (e.g., gates G10–G15) corresponds to the desired programmable device (31) which is to be sent to load (35). Thus, while data information from each of programmable device (31) output may be available to each of the AND gates, it is the processor's control of D flip flop logic circuit (27) which determines which signal (39) will be sent to load (35).

FIG. 4 illustrates a typical three phase bridge circuit design common for direct current (DC) brushless motors. In accordance with one embodiment of the present invention, the inputs to the motor, identified as A, B, C, D, E and F receive a signal from corresponding programmable devices (31) to apply power to the motor in a desired manner to properly commutate, control and sequence the power applied to the motor. This embodiment provides an efficient method for updating the six PWM generators that control the switching elements of the three phase bridge circuit.

FIG. 5 illustrates the four switching elements of a typical H-bridge circuit design common for direct current (DC) brush motors. This embodiment provides an efficient method for updating the four PWM generators that control the switching elements of the H-bridge circuit.

As those of skill in the art will realize, the concepts disclosed herein can be implemented by individual discrete components, on an integrated circuit or like device (such as, for example, a microchip) or by a combination of both. The exact implementation is a design choice which remains within the spirit and the scope of the present invention.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of a method and apparatus for accelerating communication between controllable devices, is followed.

What is claimed is:

1. A method for accelerating communication between a first programmable device receiving address information from a processor and a plurality of second programmable devices each having an addressable memory location and receiving an associated data from the processor comprising the steps of:

generating at the first programmable device a decoded memory address of an addressable memory location from the processor;

transmitting the decoded memory address to all of the plurality of second programmable devices in a first write operation; and allowing the first programmable device to control at least one of the plurality of second programmable devices to generate an output signal corresponding to its associated data in a second write operation.

2. The method of claim 1 wherein each of the plurality of second programmable devices is a pulse width modulator generator.

3. The method of claim 1 wherein the first programmable device is a D flip flop logic circuit and each of the plurality of second program the devices is a pulse width modulator generator.

4. The method of claim 2 further including the step of coupling each of the plurality of second programmable devices to a load.

5. The method of claim 4 further including the step of coupling an amplifier between each of the plurality of second programmable devices and the load.

6. The method of claim 5 wherein the load is a motor.

7. The method of claim 2 further including the step of introducing a third programmable device coupled to at least one of the plurality of second programmable devices, the first programmable device controlling the third programmable device to redirect the output signals from selected second programmable devices during the second write operation.

8. The method of claim 7 further including the step of coupling each third programmable device to a load.

9. The method of claim 8 further including the step of coupling an amplifier between each third programmable device and the load.

10. The method of claim 9 wherein the load is a motor.

11. A method to accelerate data transfer between a control processor and a plurality of controllable devices attached to a control device, the controllable devices receiving data from a master processor, the controllable devices further having an addressable memory location and an output, the method comprising the steps of:

allowing the control processor to decode at least one address from the master processor corresponding to predetermined addressable memory locations;

transmitting the data to each controllable device in a single write operation; and enabling the control processor to control selected controllable devices to transfer the data to the control device in a second write operation.

12. The method of claim 11 wherein the control processor is a D flip flop logic circuit, each controllable device is a pulse width modulator generator and the master processor is a computer processor.

13. The method of claim 12 further including the step of coupling a plurality of amplifiers between each controllable device and the control device.

14. The method of claim 13 wherein the controllable device is a motor.

15. An apparatus for enhancing data communication between controllable devices, the apparatus comprising:

a first controllable device programmed to decode an address from a control processor; and a plurality of second controllable devices receiving data from the control processor in a first write operation, each second controllable device adapted to generate an output corresponding to the data, each second controllable device coupled to the first controllable device, the first controllable device transmitting the decoded address to each second controllable device in the first write operation, each of the plurality of second controllable devices generating an output signal corresponding to the data in a second write operation.

16. The apparatus of claim 15 wherein the first controllable device is a processor and each of the plurality of second controllable devices is a pulse width modulator.

17. The apparatus of claim 16 further including at least one third controllable device coupled to at least one of the plurality of second controllable devices, the first controllable device controlling the third controllable device to redirect outputs from at least one of the plurality of second controllable devices during the second writs operation.

18. The apparatus of claim 17 wherein each third programmable device is a multiplexer logic circuit.

19. The apparatus of claim 18 wherein each third programmable device is coupled to a load.

20. The apparatus of claim 19 further including an amplifier between each third controllable device and the load.

21. The apparatus of claim 20 wherein the load is a motor.

* * * * *